(12) United States Patent
Blight et al.

(10) Patent No.: US 6,785,542 B1
(45) Date of Patent: Aug. 31, 2004

(54) RESOURCE PROXY FOR MOBILE WIRELESS ELECTRONIC DEVICES

(75) Inventors: David Blight, Santa Clara, CA (US); Elaine Lusher, Pleasanton, CA (US); Stuart Eichert, Mountain View, CA (US); Cathy Summers, Fairfax, VA (US)

(73) Assignee: Palm Source, Inc., Sunnyvale, CA (US)

( * ) Notice: Subject to any disclaimer, the term of this patent is extended or adjusted under 35 U.S.C. 154(b) by 417 days.

(21) Appl. No.: 09/796,863

(22) Filed: Feb. 28, 2001

(51) Int. Cl.[7] ........................... H04Q 7/20; G06F 15/16; G08B 5/22
(52) U.S. Cl. ..................... 455/426.1; 709/245; 340/7.23
(58) Field of Search .............................. 455/426.1, 412; 709/245, 217; 340/7.23

(56) References Cited

U.S. PATENT DOCUMENTS

| | | | | |
|---|---|---|---|---|
| 5,974,300 A | * | 10/1999 | LaPorta et al. | ............. 340/7.23 |
| 6,032,195 A | * | 2/2000 | Reber et al. | ................. 709/245 |
| 6,549,773 B1 | * | 4/2003 | Linden et al. | ............ 455/426.1 |
| 6,671,738 B1 | * | 12/2003 | Rajchel et al. | ............... 709/245 |

OTHER PUBLICATIONS

Burr–Brown Products, Touch Screen Controller, Copyright 1999–2003, Texas Instruments Incorporated, Texas.

\* cited by examiner

Primary Examiner—William Cumming
(74) Attorney, Agent, or Firm—Wagner, Murabito & Hao LLP

(57) ABSTRACT

A method and system supporting location based services for a mobile electronic device that supports multiple wireless communication technologies. The mobile device contains a resource proxy for dynamically storing a set of resources that are available to the electronic device and that are location specific, e.g., accessible via a point that is near the electronic device. The resource proxy contains a resource table recording the available resources and a gateway table indicating a pathway for reaching the data. The resource proxy definitions are technology independent with respect to the communication mechanisms required to obtain the data. Resources are added to the resource proxy via a resource discovery mechanism automatically performed by the mobile device. Multiple network gateways can be defined and each is responsible for requesting and retrieving information for the resource proxy. Network gateways are coupled to network interfaces which provide the logic required to perform wireless communication using particular communication mechanisms, e.g., Bluetooth or wireless LAN, etc. Applications interface with the resource proxy using technology independent commands in order to obtain information from the available resources recorded in the resource proxy. Using the system of the invention, available resources for a particular location are collected via a single process/database on the mobile device and presented to the applications in a uniform way.

22 Claims, 15 Drawing Sheets

RESOURCE PROXY FOR MOBILE WIRELESS ELECTRONIC DEVICES

BACKGROUND OF THE INVENTION

1. Field of the Invention

The present invention relates to the field of data processing. More specifically, embodiments of the present invention relate to providing a mechanism for a mobile wireless electronic device (e.g., a portable computer system, a palmtop computer system, or any other hand-held electronic device that utilizes a display screen, such as a cell phone, a pager, etc.) to provide and process location based information.

2. Related Art

As the components required to build a computer system have reduced in size, new categories of electronic devices and computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer (calendar, datebook, etc.) and electronic notepads, to name a few. Palmtop computers with PIM software have been know as Personal Digital Assistants (PDAs). Many PDAs have a small and flat display screen associated therewith.

In addition to PDAs, other portable electronic devices have display screens, such as cell phones, electronic pagers, remote control devices and other wireless portable devices. All of these devices have been adapted to display short lists of information on the display screens to help the user organize and display information, e.g., phone records.

User convenience is a very important factor for portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the user's everyday activities.

Similarly, the more useful the device, the more the device will be used. The functionality of mobile wireless devices is undergoing a transition. Mobile devices are evolving from a single application device with dedicated specific purpose communication channel (for example, a cell phone or pager), to more general-purpose devices with more flexible data communication capabilities. These changes are providing a platform that can be used to convey location relevant information to a mobile user.

More specifically, wireless technology is advancing, both in the number of options that are available for providing connectivity, and in their flexibility to provide general purpose data communication. Different technologies such as cellular technologies (e.g., CDMA, TDMA), LAN access technologies (e.g., IEEE 802.11, HomeRF) and PAN technologies (e.g., BLUETOOTH wireless communication, IR) each address a different set of needs, and provide a different set of potential services. Mobile devices are no longer restricted to one communication channel. Modular mobile devices allow network interfaces to be attached, allowing for unlimited communications configurations. In addition, BLUETOOTH wireless communication technology allows a single mobile device to simultaneously participate in multiple piconets through a single interface.

The above are relevant because the new wireless technologies are changing the ways in which wireless networks will be deployed. For instance, unlike cellular technologies which provide coverage to large geographical areas at expense to both carrier (e.g., equipment, spectrum) and user (e.g., subscription/air time charges), PAN and LAN wireless technologies are cheap and easy to deploy. Range will be limited, coverage will be spotty, but wireless service will be offered free of charge in enterprise and retail environments where the goal is not to collect connection charges, but to provide services to people.

Therefore, the changing wireless environment creates opportunities and challenges for mobile devices to make them more useful in the every day life of their users. The opportunity is to create new services, including location aware services and location aware information delivery. By providing wireless location dependent or location aware services, users with their mobile electronic devices can be made aware of services that are relevant for their location.

SUMMARY OF THE INVENTION

Specifically, what is needed is a seamless technology that provides a transparent view of all the resources available to the mobile device. What is also needed is a system in which the resources available on the network include both information (e.g., data, web pages, database records) and services (e.g., including data manipulation/translation, processing, computing, conversion, printing, and storage). Since the mobile device supports many possible applications, and the wireless networks may provide many services, what is needed is a mobile device that can coordinate the available resources with the appropriate applications. Accordingly, embodiments of the present invention provide the above advantages and others not specifically mentioned above but described in the sections to follow.

The present invention includes software to support location based services with respect to a mobile device, e.g., a PDA, that may offer multiple wireless communication mechanisms. The software allows the mobile device the ability to dynamically acquire information about surrounding services and resources. A general method is employed to wirelessly access location sensitive information on an Intranet and have the information seamlessly change as the mobile devices changes its location. The mechanism obtains resources from a network and may present a filtered list to an application resident on the mobile device.

Embodiments of the present invention include a resource proxy (e.g., broker) that can be implemented on a mobile electronic device. This proxy is responsible for collecting information about the available resources currently accessible to the device, and presenting the appropriate resources to the applications on the mobile device. The resource proxy acts as middleware between the pushing of information from the network side, and the pulling of information from the client side. A challenge in implementing a pull system is that the client needs to learn the location of the information it requires. The difficulty of push technology is that the network needs to discover which applications and what information needs to be pushed. The resource proxy serves as a single target for information. Resources are collected on the proxy, and subsets appropriate for specific applications are then transferred to the individual applications. Such subsets are created by filtering such that only those services/information predefined as of interest will be visible to the user.

A method and system are described herein for supporting location based services for a mobile electronic device that supports multiple wireless communication technologies. The mobile device contains a resource proxy for dynamically storing a set of resources that are available to the electronic device and that are location specific, e.g., accessible via a point that is near the electronic device. The resource proxy contains a resource table recording the available resources and a gateway table indicating a pathway for reaching the data. The resource proxy definitions are technology independent with respect to the communication mechanisms required to obtain the data.

Resources are added to the resource proxy via a resource discovery mechanism automatically performed by the mobile device. Multiple network gateways can be defined and each is responsible for requesting and retrieving information for the resource proxy. Network gateways are coupled to network interfaces which provide the logic required to perform wireless communication using particular communication mechanisms, e.g., Bluetooth or wireless LAN, etc. Applications interface with the resource proxy using technology independent commands in order to obtain information from the available resources recorded in the resource proxy. Using the system of the invention, available resources for a particular location are collected via a single process/database on the mobile device and presented to the applications in a uniform way.

More specifically, an embodiment of the present invention is implemented in a mobile electronic device and comprises: a memory resident resource proxy for storing information identifying resources and gateways to access the resources, the information formatted using a universal format that is independent of any communication technology; a first wireless communication interface for maintaining wireless communication with a first external source using a first communication protocol; a second wireless communication interface for maintaining wireless communication with a second external source using a second communication protocol; a first network gateway coupled to the resource proxy and to the first wireless communication interface, the first network gateway for performing automatic resource discovery regarding resources accessible over the first wireless communication interface and for recording the resources with the resource proxy using the universal format; a second network gateway coupled to the resource proxy and to the second wireless communication interface, the second network gateway for performing automatic resource discovery regarding resources accessible over the second wireless communication interface and for recording the resources with the resource proxy using the universal format; and an application program for referencing the resource proxy using the universal format to obtain a list of location based resources.

DETAILED DESCRIPTION OF THE INVENTION

Figure 1:
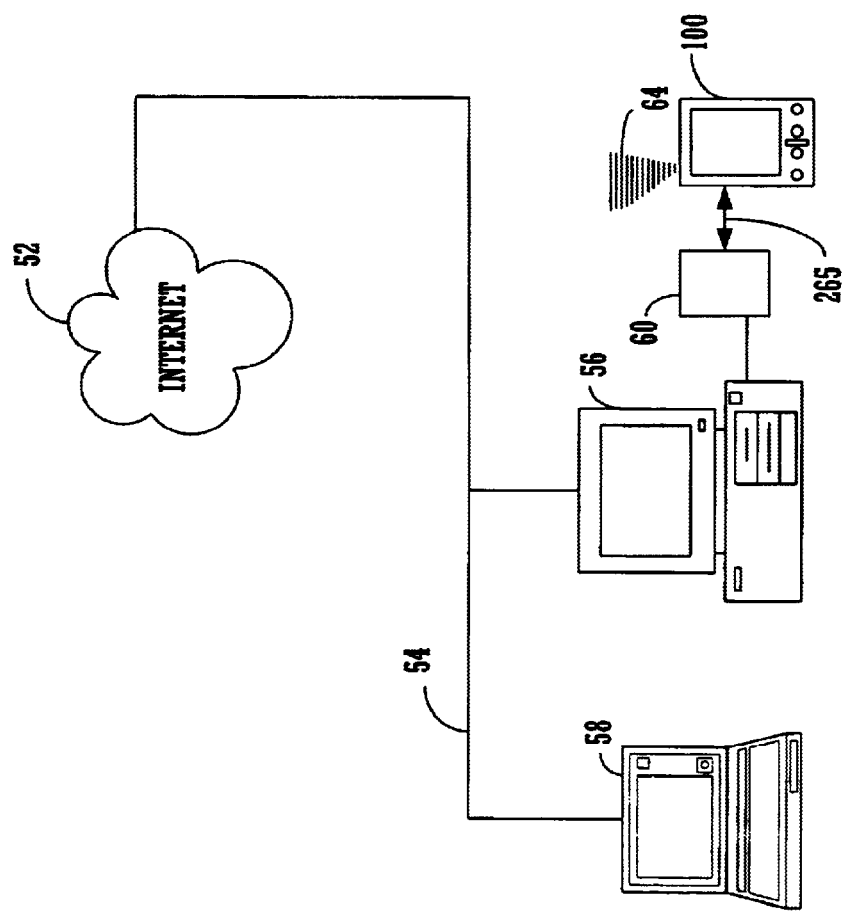
FIG. 1 is a system illustration of a palmtop or "palm sized" computer system connected to other computer systems and the Internet via a cradle device.

In the following detailed description of the present invention, a resource proxy for a mobile wireless electronic device facilitating the presentation and processing of location based information, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation And Nomenclature

Some portions of the detailed descriptions which follow (e.g., process 320 and 370) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking", "accessing" or "processing" or "computing" or "suspending" or "resuming" or "translating" or "calculating" or "determining" or "scrolling" or "displaying" or "recognizing" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The processes of the present invention described herein are particularly applicable to portable electronic devices that have display screens and that contain wireless communication capability. These devices include, for instance, cell phones, pagers and portable computer systems (e.g., PDAs, etc.). Although applicable across a wide variety of platforms and devices, the present invention is described herein by example with respect to a portable or mobile computer system.

FIG. 1 illustrates an exemplary networked system 50 that can be used in conjunction with an embodiment of the present invention. System 50 is exemplary only and comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 (or a separate communication channel) can provide communication with the Internet 52 using a number of well known protocols.

Bus 54 is also coupled to an optional cradle 60 (or cable dock) for receiving and initiating communication with an exemplary palmtop ("palm-sized") portable computer system 100. Cradle 60 provides an electrical and mechanical communication interface between bus 54 (and anything coupled to bus 54) and the computer system 100 for two way communications. Computer system 100 may also contain a wireless infrared communication mechanism 64 for sending and receiving information to or from other devices. As discussed more fully below, computer system 100 also contains one or more other wireless communication mechanisms, e.g., cellular phone, BLUETOOTH wireless communication and/or wireless LAN (e.g., IEEE 802.11), for instance.

Figure 2A:
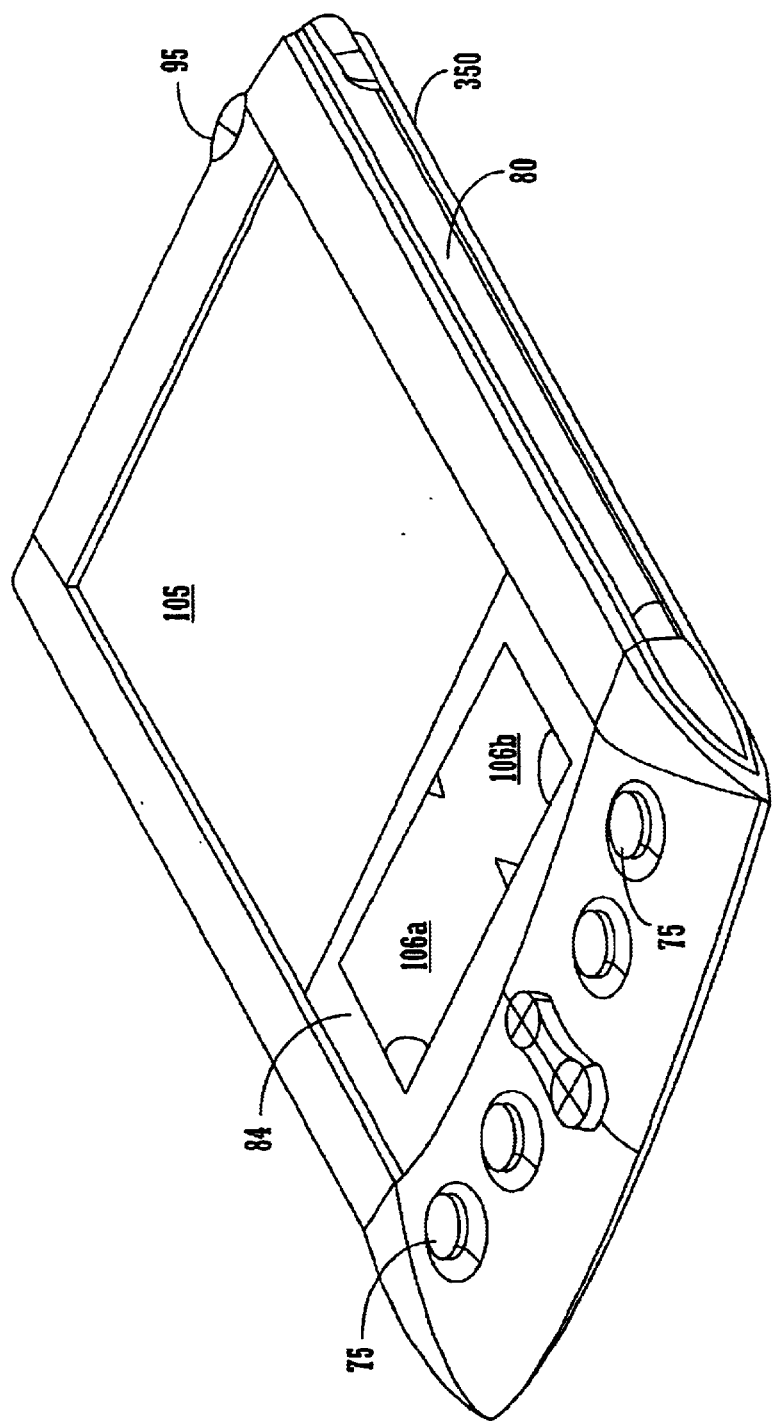
FIG. 2A is a top side perspective view of an exemplary palmtop computer system.

FIG. 2A is a perspective illustration of the top face 100*a* of one embodiment of the palmtop computer system. The top face 110*a* contains a display screen 105 surrounded by a bezel or cover. A removable stylus 80 is also shown. The display screen 105 contains a transparent touch screen (digitizer) able to register contact between the screen and the tip of the stylus 80. The stylus 80 can be of any material to make contact with the screen 105. As shown in FIG. 2A, the stylus 80 is inserted into a receiving slot or rail 350. Slot or rail 350 acts to hold the stylus when the computer system 100*a* is not in use. Slot or rail 350 may contain switching devices for automatically powering down and automatically power up computer system 100*a* based on the position of the stylus 80. The top face 100*a* also contains one or more dedicated and/or programmable buttons 75 for selecting information and causing the computer system to implement functions. Other buttons (icons) can be implemented within a silk screen layer material 84 on which regions 106*a* and 106*b* reside. An exemplary on/off button 95 is also shown.

FIG. 2A also illustrates a handwriting recognition pad or "digitizer" containing two regions 106*a* and 106*b*. Region 106*a* is for the drawing of alpha characters therein for automatic recognition (and generally not used for recognizing numeric characters) and region 106*b* is for the drawing of numeric characters therein for automatic recognition (and generally not used for recognizing numeric characters). The stylus 80 is used for stroking a character within one of the regions 106*a* and 106*b*. The stroke information is then fed to an internal processor for automatic character recognition. Once characters are recognized, they are typically displayed on the screen 105 for verification and/or modification.

Figure 5:
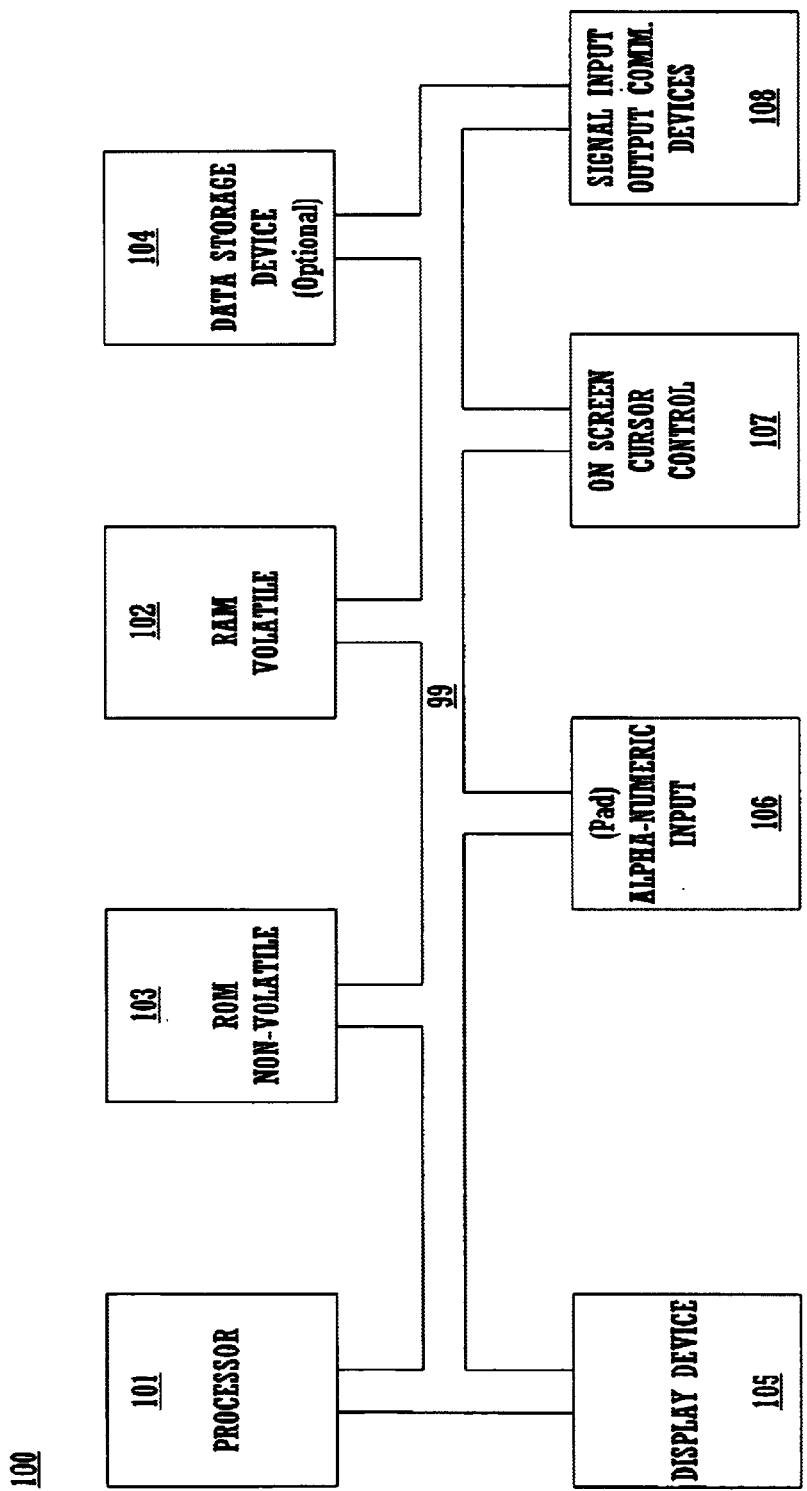
FIG. 5 is a logical block diagram of an exemplary palmtop computer system in accordance with an embodiment of the present invention.

The digitizer 160 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (FIG. 5). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 (FIG. 5) for later analysis.

Figure 2B:
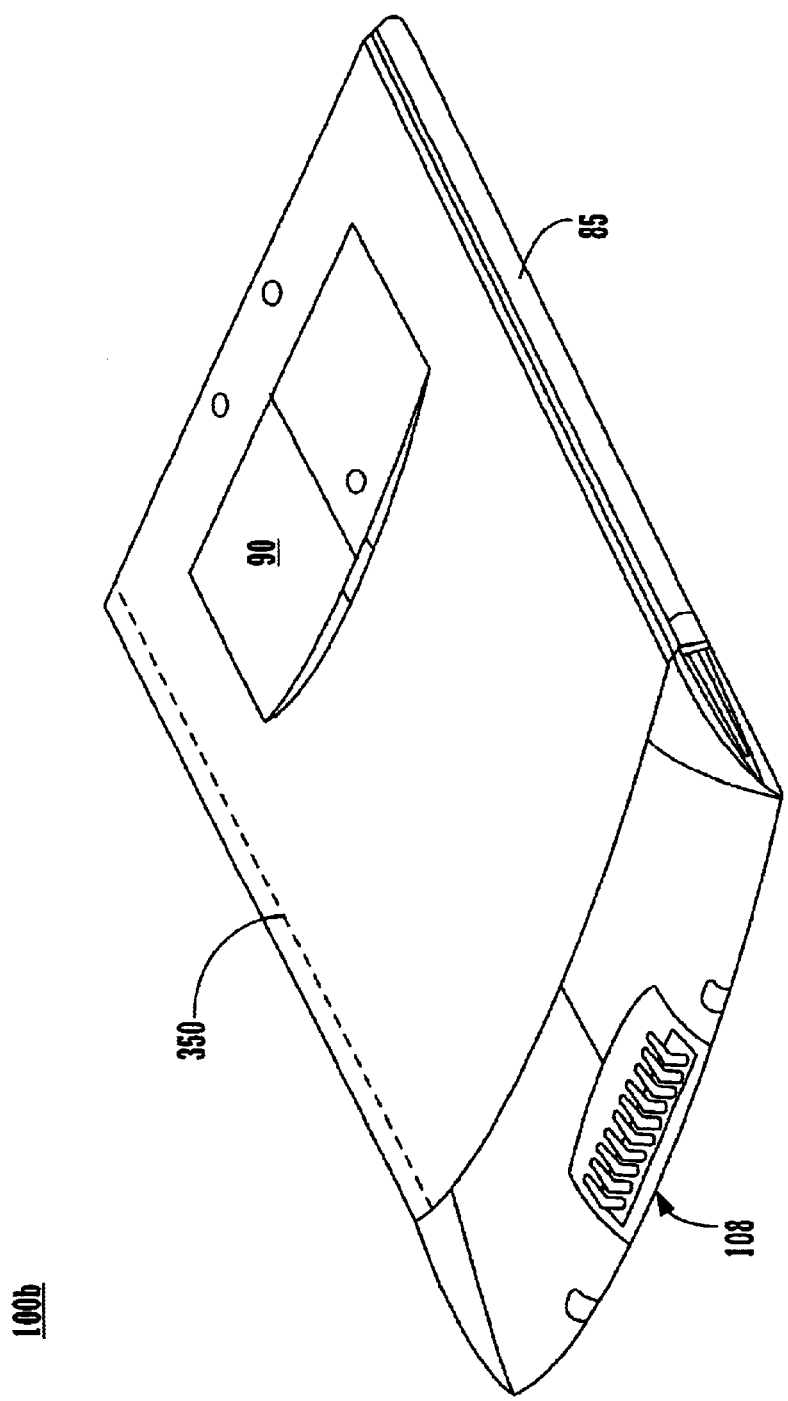
FIG. 2B is a bottom side perspective view of the exemplary palmtop computer system of FIG. 2A.

FIG. 2B illustrates the bottom side 100*b* of one embodiment of the palmtop computer system. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc. In FIG. 2B is also shown the stylus receiving slot or rail 350.

Figure 2C:
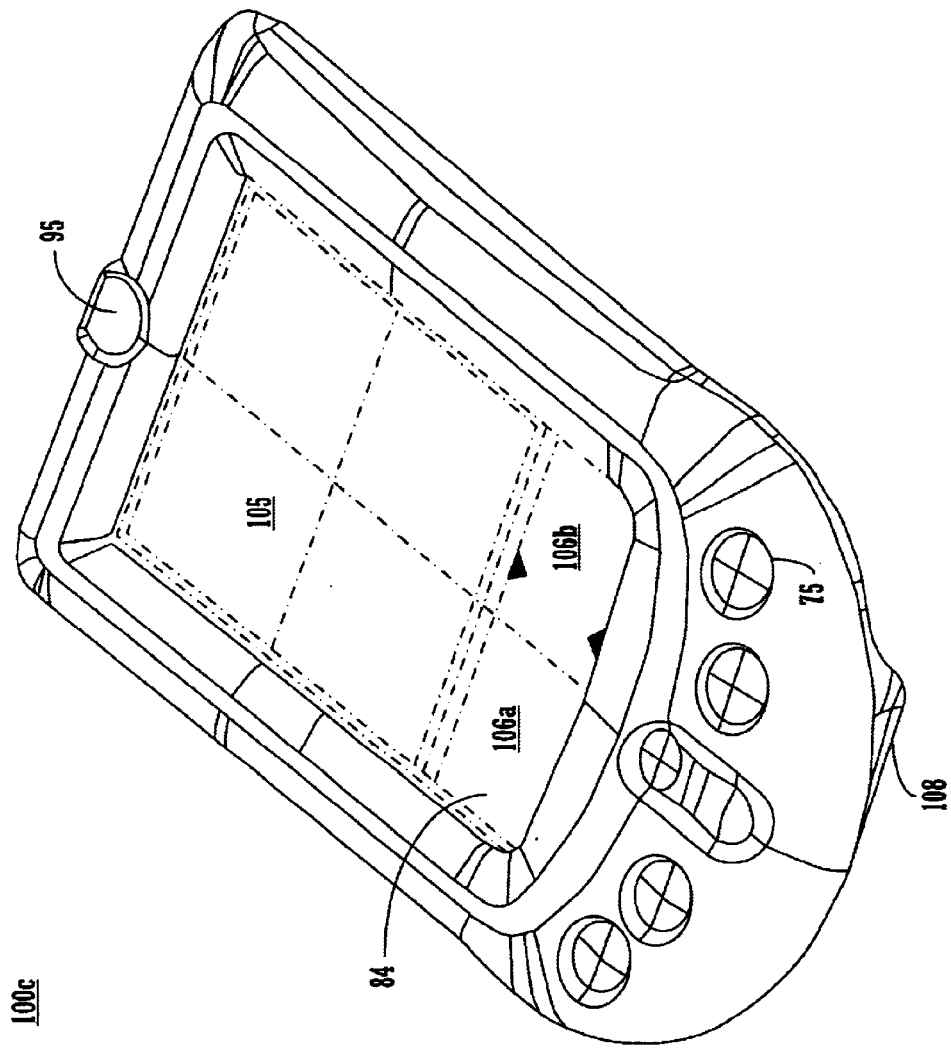
FIG. 2C is a perspective top view of another embodiment of the exemplary palmtop computer system.

FIG. 2C illustrates a front perspective view of another implementation 100*c* of the palmtop computer system. As shown, the flat central area is composed of a display screen area 105 and a thin silk screen layer material portion 84. Typically, the silk screen layer material portion 84 is opaque and may contain icons, buttons, images, etc., graphically printed thereon in addition to regions 106*a* and 106*b*. The display screen area 105 and portion 84 are disposed over a digitizer.

Figure 3:
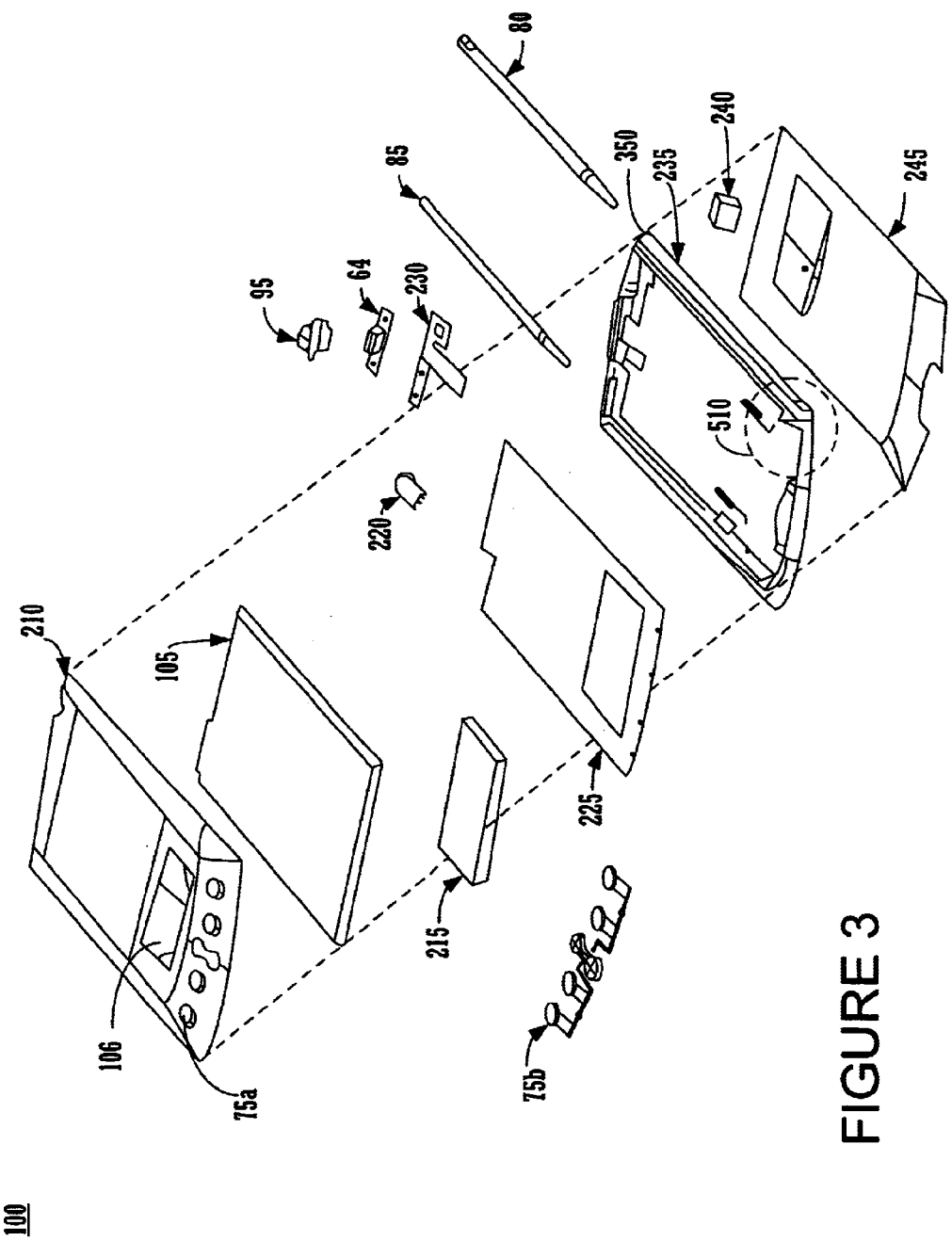
FIG. 3 is an exploded view of the components of an exemplary palmtop computer system of FIG. 2A.

FIG. 3 is an exploded view of the exemplary palmtop computer system 100. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. In one embodiment, the display 105 is a flat panel multi-mode display capable of both monochrome and color display modes.

The touch screen can be a digitizer. A battery 215 provides electrical power. Replaceable cells or rechargeable batteries can be used. Well known electronics coupled to the battery 215 can detect the energy level of the battery 215. This information can be sampled by the computer system 110 (FIG. 5) using well known techniques. The digitizer of FIG. 3 can be implemented using well known devices, for instance, using the ADS-7846 device by Burr-Brown that provides separate channels for spatial stroke information and pressure information. A contrast adjustment (potentiometer) 220 is also shown but can also be implemented electronically, e.g., by software, (FIG. 2C) without any manual knob. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Optional position adjustable antenna 85 is shown. The midframe 235 contains the stylus receiving slot or rail 350.

An optional radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used. The wireless communication capability of system 100 can be implemented using a number of well known technologies, such as, for instance, cellular phone technology, BLUETOOTH wireless communication, wireless LAN (e.g., 802.11), etc. With respect to cellular phone wireless, the system 100 may contain an integrated cellular phone system.

Figure 4:
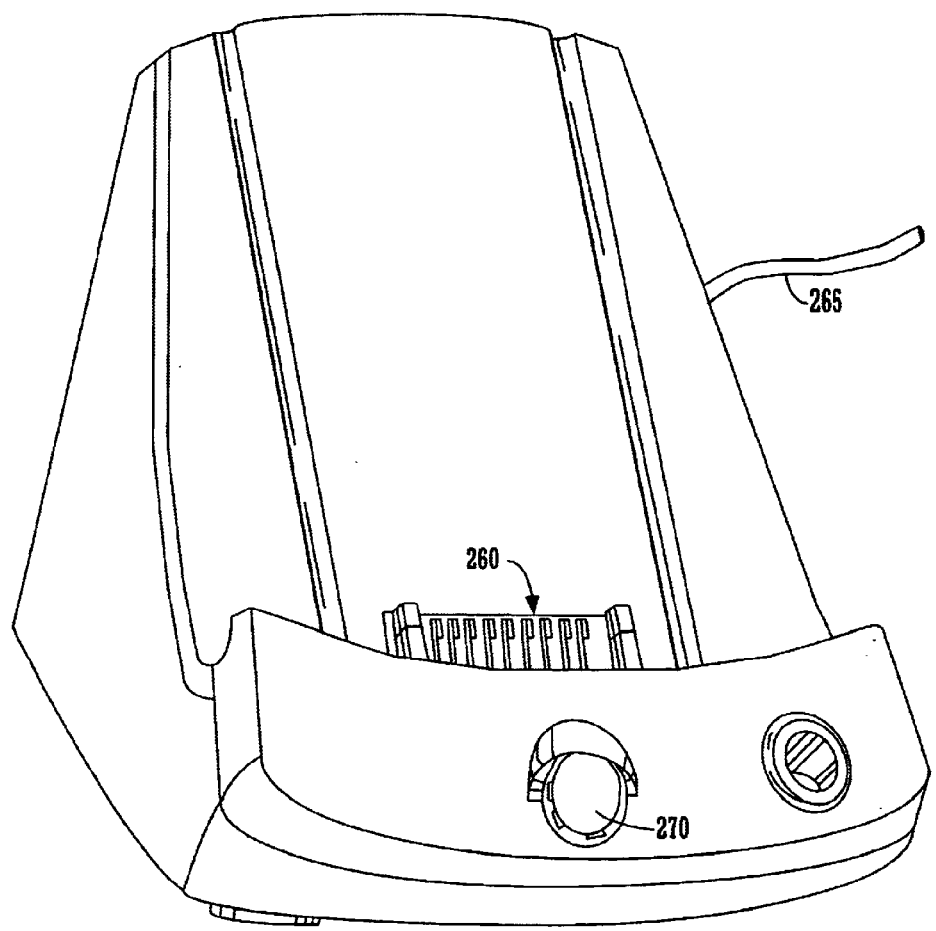
FIG. 4 is a perspective view of a cradle device for connecting a palmtop computer system to other systems via a communication interface.

FIG. 4 is a perspective illustration of one embodiment of the cradle 60 for receiving the palmtop computer system 100. In other embodiments, cradle 60 is not a stand-up device but is rather part of a cable connection between the palmtop computer system 100 and the desk top unit. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

FIG. 5 illustrates circuitry of palmtop computer system 100, some of which can be implemented on PC board 225. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., thin profile removable memory) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 110 of FIG. 5 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In one embodiment, the display 105 utilizes color sequential scanning but could also utilize color filters with subpixels.

Signal communication device 108, also coupled to bus 99, can be a serial port for communicating with the cradle 60. Device 108 can also include an infrared communication port.

Resource Proxy of the Present Invention

Figure 6:
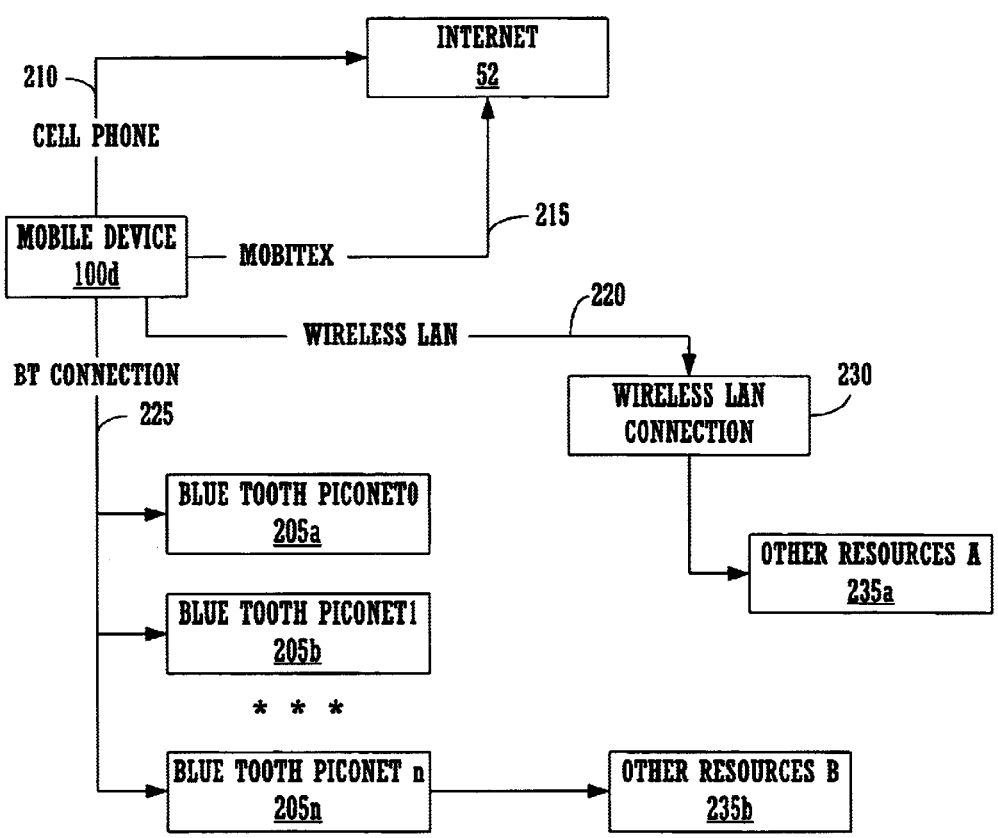
FIG. 6 illustrates a system environment in which embodiments of the present invention can operate including a mobile wireless electronic device and one or more available location based resources.

FIG. 6 illustrates a system environment 200 in which an embodiment of the present invention can operate. In a large retail or enterprise environment, a standard set of information/resources may be made available to mobile devices through many access points. Environment 200 includes location based resources that can be made available to a mobile electronic device 100d when that device comes into close proximity with the available resources. The available resources include, in this example, several piconets 205a–n within the BLUETOOTH wireless communication protocol. Also included are other resources B 235b that are made available via an access point within the BLUETOOTH wireless communication piconet 205n. Also included are resources of a wireless LAN 230, e.g., according to the IEEE 802.11 standard. Other resources A 235a are also available via access point of the wireless LAN 230. The BLUETOOTH wireless communication resources communicate with the mobile device 100d using a wireless BLUETOOTH wireless communication communication network 225. The wireless LAN resources communicate with the mobile device 100d using a wireless LAN communication network 220.

The mobile device 100d may contain cellular phone circuitry which can communicate, e.g., with the Internet 52, using a cellular phone wireless communication network 210. Alternatively, a wireless mobitex network 215 can be used. Because the resources of FIG. 6 become available to the mobile device 100d when the device comes into close proximity of these resources (or close proximity to gateways to these resources), they are called "location based" available resources. Close proximity is defined as that distance required to maintain communication using low power wireless communication mechanisms.

It is appreciated that any number of different wireless mechanisms can be used in accordance with the embodiments of the present invention and the one selected for illustration in FIG. 6 are exemplary only. The wireless Mobitex network can be any wireless network. Specific instances of such networks include a proprietary cellular based network, a wireless overlay network or a next generation wireless IP network. As discussed further below, embodiments of the present invention facilitate the discovery of, access to and usage of location based available resources to the mobile device 100d.

Embodiments of the present invention support multiple wireless technologies. The system does not depend upon any single wireless technology. Available resources to the mobile devices are collected via a single process/database on the mobile device 100d to relieve each application from the burden of discovering its own resources. Identical resources may be made available through multiple access points, e.g., other resource A 235a and other resource B 235b could be the same resource. It is important that the mobile device 100d does not need to search for new resources on each access point offering identical services.

The list of available resources on the mobile device is configured to retain resource references even after the resource is no longer available (but not necessarily indefinitely). This feature is important to handle spotty coverage, re-entry into network coverage, and temporary loss of connectivity due to interference. Resources references are made available in a format understood by the application. For instance, a web page (e.g., HTML encoded) is suitable for a web-based browser while XML may be suitable for many applications. Other appropriate formats could be used with other applications.

When an application requests a list of available resources, a filter may be applied to limit the returned resources. Examples of filtering mechanisms or triggers are: 1) a protocol (from URL); 2) a simple indicator if the application can communicate with resource; 3) keywords; and 4) attributes, where attributes are the attributes of a data object describing a given user's filtering preferences (e.g. such as a "user profile" object). Additionally, filtering can be performed using a number of different mechanisms. For instance, filtering in accordance with the present invention can be performed using metadata which is data that describes the data in some way. This data description could be via metatags which are tags which summarize the data, such as, "new, California water pollution" or via semantic tags which describe the content of the data, such as, "part number," "price," etc. Filtering could also be performed based on data types, e.g., maps, text, etc. Filtering could also be performed based on object attributes which are object attributes in an object-oriented programming scheme, such as, "object=car and attributes=model and make."

Generally, the resource proxy may use URLs as a technology independent resource locator. A URL is used as an example of a mechanism for addressing resources/information, but the resource locator could be any mechanism which has a well-known addressing scheme.

The system of the present invention does not hinder or limit any applications, but provides benefit to applications which want to use it. In other words, nothing prevents an application from directly accessing network resources directly.

Some wireless technologies such as BLUETOOTH wireless communication have no explicit mobility support, so a minimal level of support is maintained by the resource proxy. Mobility support is not complex, reflecting the short range and rapid traversing of some access point coverage areas. It is appreciated that the system does not require specific or preclude the use of existing Service Discovery (SD) protocol and systems such as JINI, Salutation, BLUETOOTH wireless communication SDP. The resources that are proxied/brokered by the present invention are user level resources versus application component level services proxied by technologies such as JINI, RMI, CORBA, or ActiveX. Any of these technologies could be used in resource proxy/information server communication if required.

Figure 7:
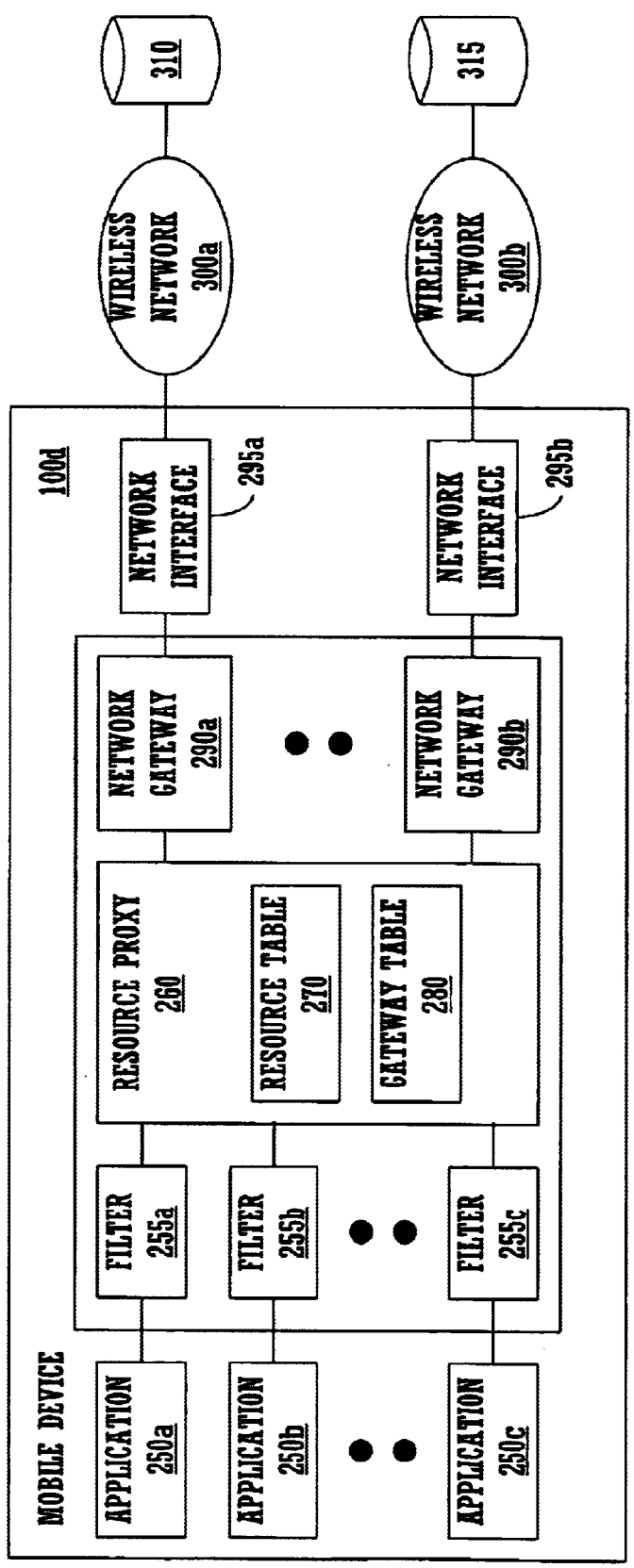
FIG. 7 illustrates a logical block diagram of one embodiment of the resource proxy of the present invention implemented on a mobile wireless electronic device.

FIG. 7 illustrates a system overview of the components of an embodiment of the present invention. Mobile device 100d, in addition to the other components described above, contains a resource proxy 260. Resource proxy 260 contains a resource table 270 and a gateway table 280. Multiple applications 250a–250c interface with the resource proxy 260 via a number of respective filters 255a–c. The resource proxy maintains a record of available location based resources to the mobile device 100d. The resource proxy communicates through a number of network gateways 290a–290b which interface with network interfaces 295a–295b. The network interfaces 295a–295b are particular to a wireless communication protocol and each interfaces directly with a wireless network 300a–300b (e.g., BLUETOOTH wireless communication. wireless LAN, cellular, etc.). The network interfaces perform automatic resource discovery processes. The wireless network 300a–300b provides a pathway to one or more available resources 310–315.

The mobile device 100d contains a set of applications 250a–250c. In one embodiment, the resource proxy 260 serves as middleware between the applications and the network interfaces 295a–295b on the mobile devices.

Resource Proxy. The resource proxy 260 is a memory resident resource that maintains a list of available location based resources. It is a central repository for information required to access resources that can be obtained wirelessly using a number of different wireless communication protocols and mechanisms of a mobile device. The resource proxy 260 also offers a standard format in which to access these resources so that an application need not be aware of the wireless communication mechanism or protocol being used to access the data.

More specifically, the resource proxy 260 maintains a resource table 270 and a gateway table 280. The resource table 270 maintains a list of available resources as described below. The gateway table 280 maintains a list of names and addresses in a gateway table. The resource table 270 is used for locating information. The gateway table 280 is used for accessing resources. Therefore, the resource table 270 maintains a list of available resources. The gateway table 280 is used to select which network interface/network connection is used to satisfy a request for information. In other words, the gateway table 280 includes the particular pathway that is used to access a resource that is listed in the resource table 270.

Whenever a resource is detected through one of the network interfaces, e.g., via their automatic resource discovery procedures, a record of the resource is added to the resource table. In one embodiment, a standard format is used to present the resource, e.g., the Uniform Resource Locator (URL) format can be used as the standard resource address format. Also associated with each resource is a set of one or more network gateways, which represent logical network interfaces through which the resources may be accessed. One gateway is flagged as active and represents the current gateway which will be used for accessing the resource. Keywords, attributes, and textual descriptions may optionally also be associated with the entries. These may be explicitly set by the provider of the resource reference, extracted from service discovery attributes, or determined from the resource itself. They are used in filtering resources lists, and generating annotated resource lists.

In one embodiment, each resource entry in the resource table 270 contains a name of the resource (e.g., URL), a status indication, an internal gateway, an active gateway, a last access indicator, an expiration, a keywords field, an attributes field and a resource description. The resource name can be expressed as an URL for the information/service location. With respect to the status indicator, this value identifies the current state of the resource, e.g., available, unavailable or invalid. A resource is available if the resource can be accessed based on current connectivity. The resource is unavailable if the resource is not available through any current network access points. The resource is invalid if the resource is no longer available (no matter where the mobile device is located).

The internal gateways field maintains a list of internal gateways through which the resource may be found. The active gateway indicates the current internal gateway through which to access the resource. The last access indicates a time stamp of the last access of the resource. The expiration field indicates the time that the particular resource expires. The keywords field maintains a listing of keywords used in describing the resource. The attributes field indicates a list of words used in describing the resource. The resource description field indicate a text based description of the resource and may indicate a screen displayable label indicating the resource with a common or generic name.

The gateway table 280 is used to determine which network gateway should be used for resolving a request for an URL. This table 280 is not maintained via IP routing protocols, but rather by resource descriptions from connected networks/devices. As an example to illustrate the operation of the gateway table 280, assume a mobile device which has BLUETOOTH wireless communication access to different LAN access points (currently in range of two BLUETOOTH wireless communication LAN access points, each of which is in a separate piconet). On each of the LANs associated with each of the piconets, there is web proxy server, which can proxy web requests for multiple domains, but not general Internet access. This may correspond to the situation where two stores in mall (located next to each other) each offer a web proxy to access store related information, and credit processing sites. In this example, store1 can proxy requests for domains *.store1.com, *.bank1.com while store2 can proxy requests for domains *.store2.com, *.bank2.com.

When a web page for creditcard.bank1.com needs to be accessed, it is needed to be known that requests for *.bank1.com should be send to proxy.store1.com. In IP based networks, this resolution is performed by DNS, and IP gateway tables. However, device 100d does not rely on IP (or IP based protocol or services such as DNS). Therefore, what is implemented is a system to handle name resolution and routing. The approach is to route based on access addresses, and explicitly assigned information.

Specifically, each entry in the gateway table 280 may contain an address or address range, a host or domain name, a network gateway, a flag and a default gateway which indicates the default gateway for revolving requests.

It is appreciated that FIG. 7 also illustrates a number of different filters 255a–c that can be defined, one for each application. The filters can use keywords or attributes in which to filter the contents of the resource table 260 that are made available for an application. Keyword or attribute matching can be used to perform the filtering processes.

Network Gateways. Also within system 100d of FIG. 7 there is a set of internal gateways 290a–290b that are maintained. A separate gateway is established for each separate piconet that is detected by resource discovery. More than one gateway can be established for the same wireless communication network type. For instance, one BLUETOOTH wireless communication network interface 295a may have a separate network gateway 290 associated with each piconet currently in range. Each gateway is responsible for requesting and retrieving information for the resource proxy 260. In other words, the gateways perform resource discovery on behalf of the resource proxy 260. The gateways isolate specific access details from the resource proxy 260. There may be a many to many relationship between network gateways 290 and network interfaces 295. One network gateway may only use one network interface at a time, but may switch network interfaces to support alternative access methods.

Specifically, in one embodiment, each gateway contains the following information, a name, a network interface pointer which defines which network interface the request will use, a network proxy which indicates a network side proxy for request handling and an access point which indicates network interface specific addressing information. Each gateway also contains a status field which indicates up if the interface is active, down if the interface is recognized, but not operational (no connection), busy if congestion is detected, e.g., the interface is up, but unusable, and invalid if the gateway is no longer available. Each gateway also contains a time stamp of state change which indicates the time of last state change and also access points which is a list of access points which provide identical service.

An access point is identified with technology specific addressing. For example, in a BLUETOOTH wireless communication network, the access point can be identified by its BLUETOOTH wireless communication address and/or its string based label. It is also useful to store location information with each network gateway. In the event that a resource becomes unavailable to the current location of the mobile device being out of network range, this information could be used to direct the mobile device to a location where access will be available.

In one embodiment, each access point reference contains the following information, an address which is technology dependent, a location which describes the location information of the access point (if known) and a state. The state can be up if the access point is active, or down if the access point is recognized, but not operational (no connection), or busy if congestion is detected, e.g., the access point is in, but unusable, or invalid if the access point is no longer available.

Figure 8:
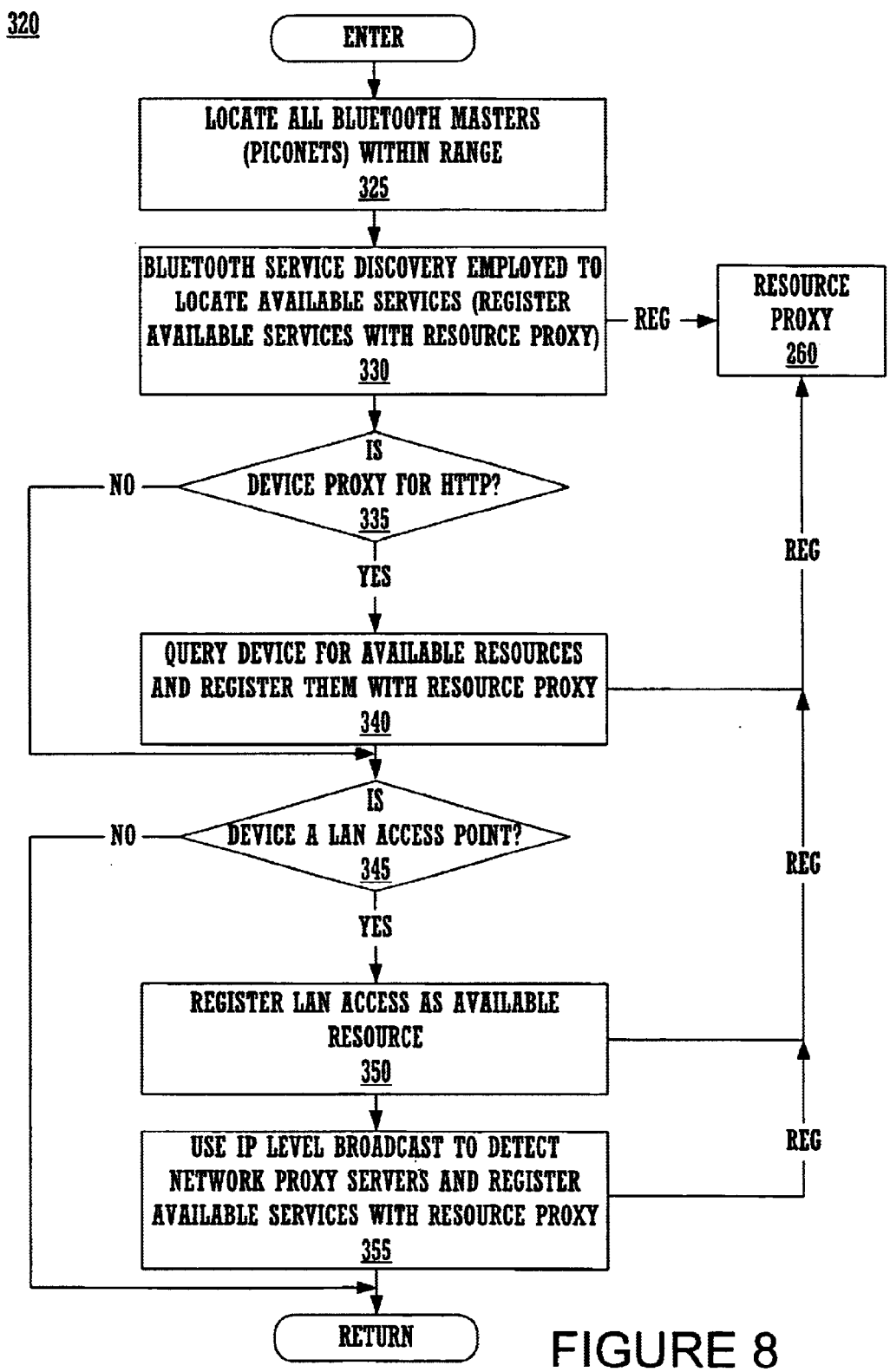
FIG. 8 is a flow diagram illustrating a discovery process of one embodiment of the present invention for discovering BLUETOOTH wireless communication situated resources within a proximity of the mobile device and updating the resource proxy accordingly.

Resource Discovery. FIG. 8 illustrates a computer implemented procedure executed by the gateways for performing resource discovery with respect to a BLUETOOTH wireless communication environment. The procedure 320 is implemented using computer code stored in memory and executed by a processor. Process 320 is periodically performed by the mobile device 100d in order to update (e.g., add and remove) resources from the resource proxy. A mobile device may have access to multiple networks through one or more wireless technologies at any given time. Each access technology may have a different addressing format, and service discovery mechanism. The goal of resource discovery is how to use the appropriate mechanism for each technology, and present the results to the resource proxy in a consistent format. It is appreciated that process 320 is automatically performed periodically in order to record and update resources of the resource proxy and is also performed transparently to the applications 250a–250c.

For the BLUETOOTH wireless communication network interface, resource discovery as performed in accordance with an embodiment of the present invention as illustrated in process 320 of FIG. 8. At step 325, the gateways locate all BLUETOOTH wireless communication masters (e.g., piconets) that are situated within range of the mobile device 100d. At step 330, well known BLUETOOTH wireless communication Service Discovery is then used in order to find and identify available services. These available services are then registered with the resource proxy 260. At step 335, if the detected device is a itself a proxy for HTTP, then at step 340 a query of the device proxy is performed for available resources. At step 340, the available services are registered with the resource proxy 260 (the resource table and gateway table are updated). At step 345, if the device is a LAN access point, the at step 350, the LAN access is registered as an available resource. This is the case were a BLUETOOTH wireless communication access point allows access to other resources, such as a LAN. At step 355, the IP level broadcast is used to detect network proxy servers and also to register available services with the resource proxy.

Figure 9:
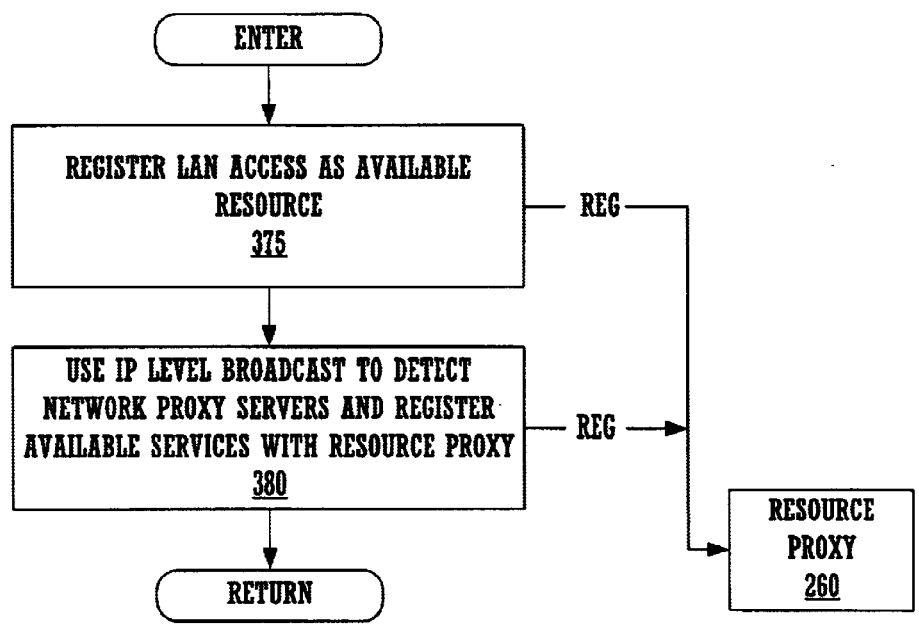
FIG. 9 is a flow diagram illustrating a discovery process of one embodiment of the present invention for discovering wireless LAN situated resources within a proximity of the mobile device and updating the resource proxy accordingly.

FIG. 9 illustrates the resource discovery process 370 for a wireless LAN example, e.g., IEEE 802.11. The procedure 370 is implemented using computer code stored in memory and executed by a processor. Process 370 is periodically performed by the mobile device 100d in order to update (e.g., add and remove) resources from the resource proxy. Discovery of all devices accessible through 802.11 is not generally feasible. Resource discovery commences at step 375 where a LAN access is registered with the resource proxy 260 as being available. At step 380, the IP level broadcast is then used to detect network proxy servers and to register available services with the resource proxy 260. It is appreciated that standard resource discovery techniques can be used at step 380 to locate printers, data, etc. It is appreciated that process 370 is automatically performed periodically in order to record and update resources of the resource proxy and is also performed transparently to the applications 250a–250c.

Figure 10A:
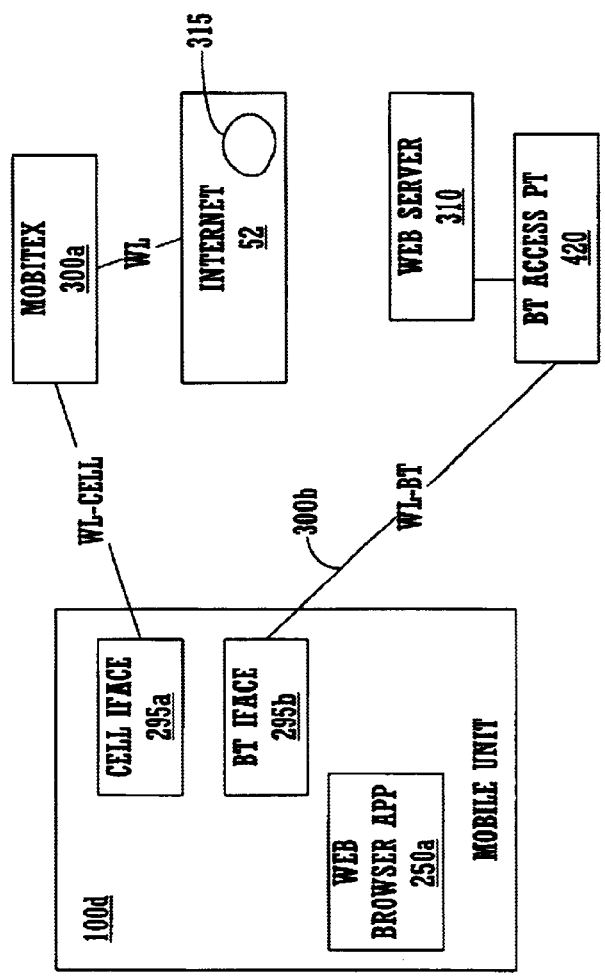
FIG. 10A illustrates an exemplary system environment in accordance with embodiments of the present invention.
Figure 10B:
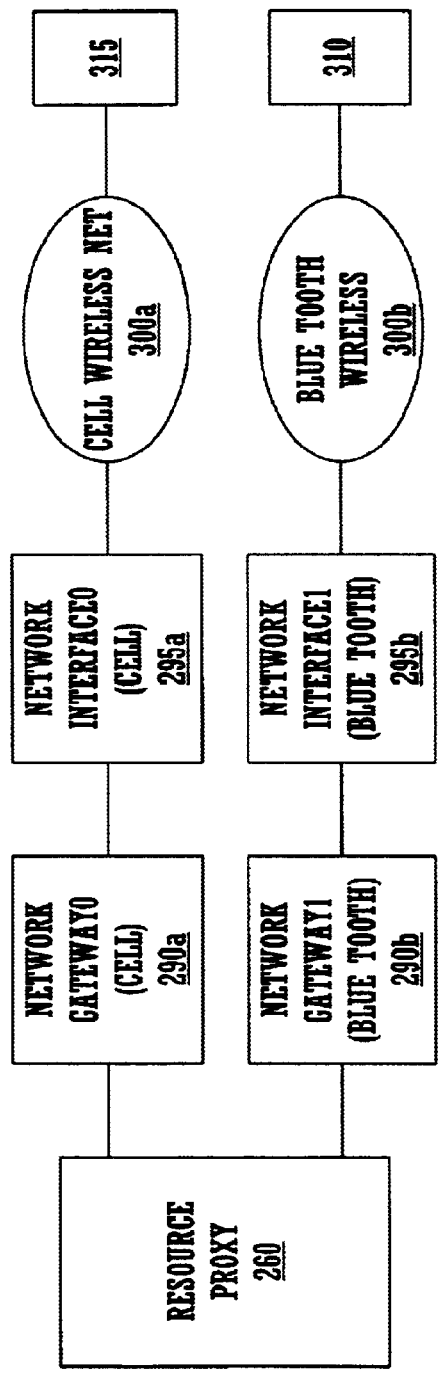
FIG. 10B illustrates a logical block diagram of one embodiment of the present invention that is configured to operate within the environment of FIG. 10A.

FIG. 10A and FIG. 10B illustrate one example of the embodiments of the present invention. FIG. 10A describes the system environment 400 of this example. The mobile device 100d contains a cell phone wireless interface (with cellular antennae) 295a and a BLUETOOTH wireless communication wireless interface 295b. The cellular interface, in this embodiment, can be a Mobitex wireless 300a which provides general Internet connectivity 52 to various resources 315. The BLUETOOTH wireless communication wireless interface provides connection to a BLUETOOTH wireless communication access point 420 which is communicatively connected to a web server 310. A web browser application 250a is also included. The web server 310 is a non-Internet connected Ethernet segment, in this example and is accessible via the BLUETOOTH wireless communication access point 420.

FIG. 10B illustrates the resulting logical block diagram of the present invention for this example. The resource proxy 260 communicates with a first network gateway 290a that is established for the cellular wireless. It also communicates with a second network gateway 290b that is established for the BLUETOOTH wireless communication. Gateway 290a communicates with network interface 295a that is used for cellular communication, which communicates over the cellular wireless net 300a to the resource 315. Likewise, the gateway 290b communicates with the network interface 295b, BLUETOOTH wireless communication, which uses the BLUETOOTH wireless communication wireless net 300b to communicate with resource 310. Gateway 290b is established for the BLUETOOTH wireless communication piconet on which the access point 420 (FIG. 10A) is located.

The operation of the example of FIG. 10A and FIG. 10B is now described. When the mobile device 100d turns on, initially there is no network connection. When the cellular antennae is raised on the mobile device 100d, a data connection is obtained through the cellular carrier network. The present invention establishes a default routing entry which is added to the resource proxy 260. The network gateway 290a is initialized by the present invention for the cellular connection.

The web browser 250a is initiated on the mobile device 100d. The web browser 250a is set-up so that that the resource proxy 260 is configured as its proxy server. It is appreciated that there are also automatic protocols for discovering proxy servers which could be used. In this configuration, any web browser request is proxied at the resource proxy 260. The only connection is the default Internet connection. A request is sent through the network gateway 290a associated with the cellular connection.

Following the turn-on of the mobile device, it then moves within range of a another BLUETOOTH wireless communication device 420, e.g., a LAN access point. At this point, service discovery is performed on the detected devices. This is performed at any time a BLUETOOTH wireless communication device is available. As a result, a LAN access profile determined using well known and standard protocols for creating a LAN access. Then, a PPP connection is established to the access point and the IP address is assigned based on well known BLUETOOTH wireless communication standards.

The present invention initializes a network gateway 290b for this piconet. Once the network gateway 290b has been established, a search for information server is performed via an IP broadcast. The information server 310 is then detected and a list of available resources and information is read. What is recorded is a web proxy server and a location server (which allows the mobile device 100d to know its own location based on the location of the access point 420). In one embodiment, the web proxy IP addresses is used as the proxy. Next, the contents of the resource proxy 260 are updated. Specifically, resource table entries are added and the resource proxy's gateway tables are updated.

The web browser 250a could now request an HTML page of available resources by requesting the information through the root file of the resource proxy, for instance, by using address:

Http:/localhost/ (for example)

The proxy server 260 would return a list of information (URLs available) that is maintained in the resource table with an optional text or graphical annotation if available. This information may be displayed on the screen of the mobile device 100d. The information includes resources available from the Internet 52 and also information available from the BLUETOOTH wireless communication access point 420. The user can filter the amount of information displayed on the screen from the resource proxy based on filters 255a–255c (FIG. 7). The filters may contain specific keywords and attributes that can be searched to identify certain resources thereby filtering others out. The particular wireless communication mechanism used to access this information is transparent to the application. The user could then view and/or select of the available location based resources.

More specifically, when the web browser 250a requests a page from the resource proxy, then the name/IP address is queried from the routing table which returns a network gateway for use. Then, the request is passed along to the corresponding network gateway which obtains the information using the appropriate wireless network. It is appreciated that the present invention can operate using any number of different wireless communication technologies and cellular, wireless LAN and BLUETOOTH wireless communication are shown only as examples.

Figure 11A:
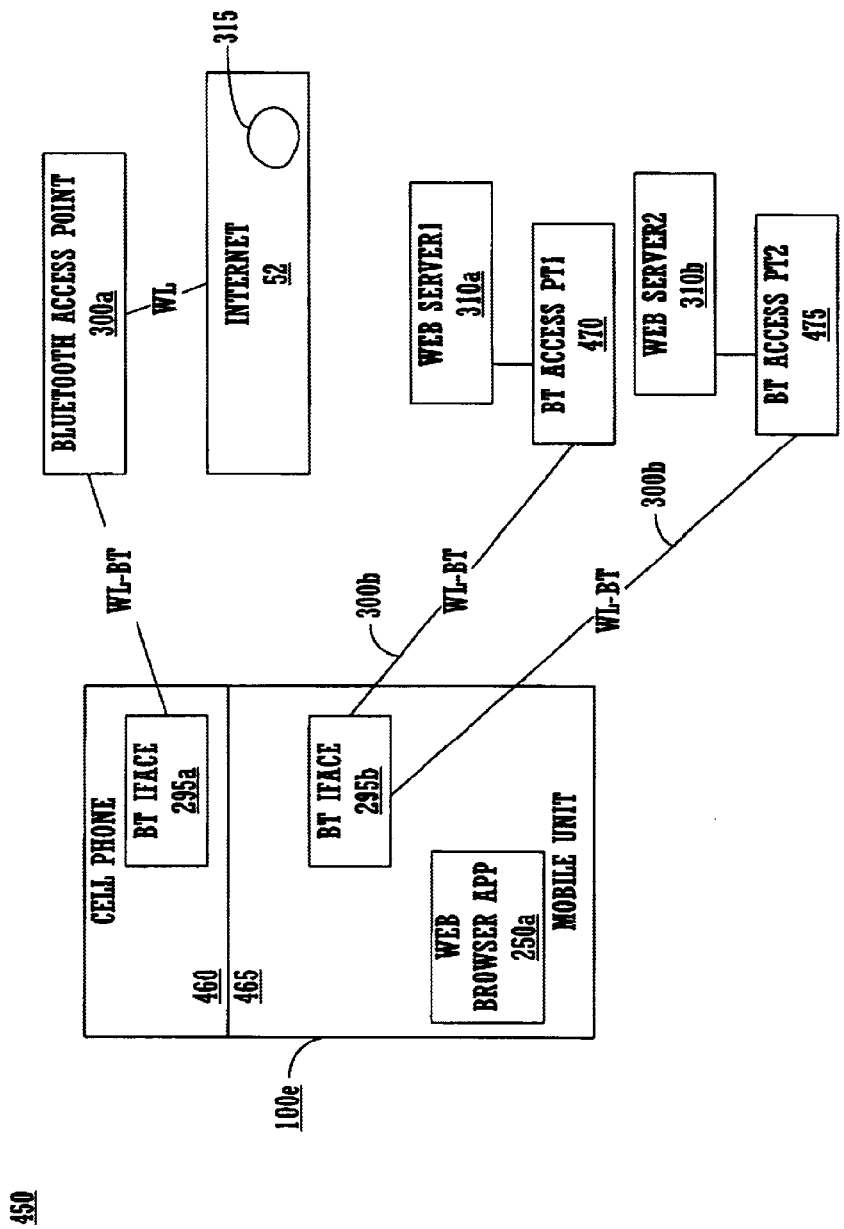
FIG. 11A illustrates a second exemplary system environment in accordance with embodiments of the present invention.
Figure 11B:
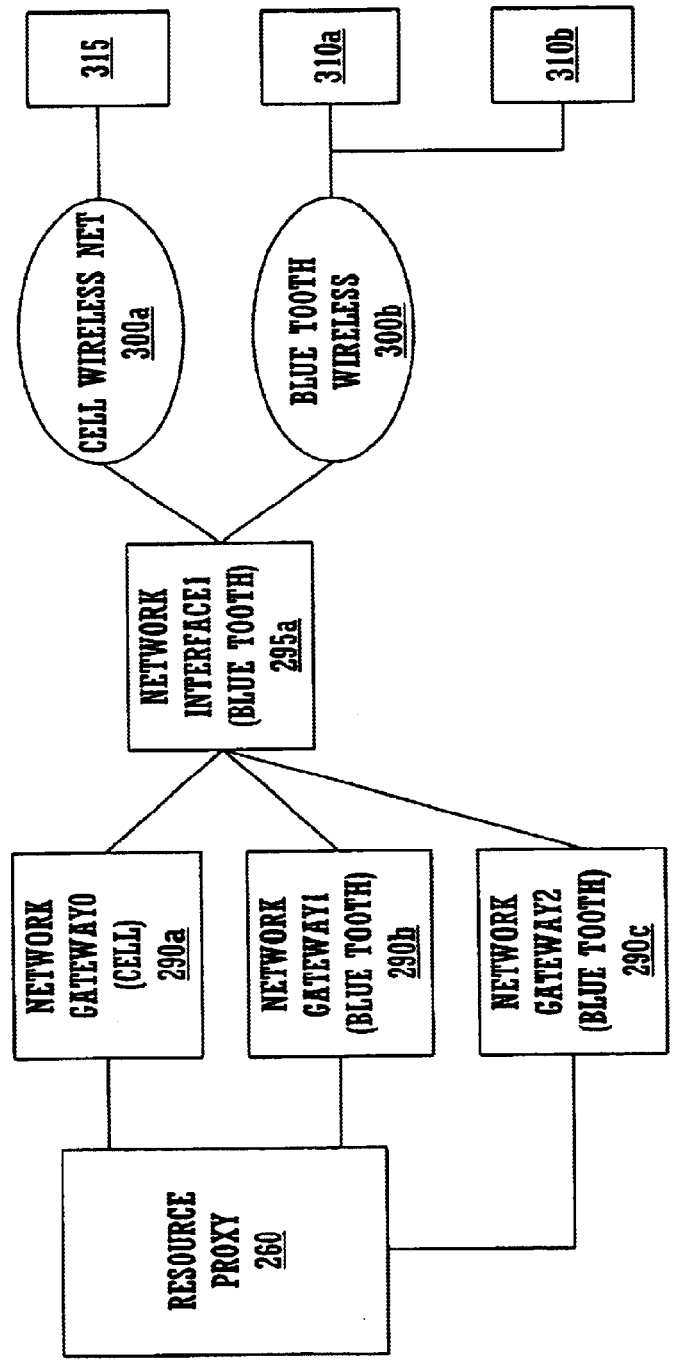
FIG. 11B illustrates a logical block diagram of one embodiment of the present invention that is configured to operate within the environment of FIG. 11A.

FIG. 11A and FIG. 11B illustrate one example of the embodiments of the present invention. FIG. 11A describes the system environment 450 of this example. Particularly, in this example, multiple networks are described that use the same wireless network, e.g., BLUETOOTH wireless communication. Also, some of these networks appear and disappear from the mobile device 100d as the device is transported.

The mobile device 100e of FIG. 11A contains a cell phone wireless interface 295a that is based on BLUETOOTH wireless communication. The device 100e also includes a BLUETOOTH wireless communication wireless interface 295b. The BLUETOOTH wireless communication interface 300a for the phone provides general Internet connectivity 52 to various resources 315. The mobile device 100e also includes another BLUETOOTH wireless communication interface 295b providing a wireless connection to a first BLUETOOTH wireless communication access point 470 and a second BLUETOOTH wireless communication access point 475. The first BLUETOOTH wireless communication access point 470 is communicatively connected to a web server 310a and the second BLUETOOTH wireless communication access point 475 is communicatively connected to another web server 310b. A web browser application 250a is also included. The web servers 310a and 310b are non-Internet connected Ethernet segments, in this example, and are accessible via their respective BLUETOOTH wireless communication access points 470 and 475.

In this example what is provided is a BLUETOOTH wireless communication enabled mobile device 100e, and a cell phone capable of providing Internet access (through BLUETOOTH wireless communication), and a multiple piconet operation. In other words, server 310a and server 310b and so the Internet 52 are accessed through different piconets.

FIG. 11B illustrates the resulting logical block diagram of the present invention for this example. It is appreciated that, in this example, multiple network gateways 290a–290c are created, although only a single network interface 295a is used. The resource proxy 260 communicates with a first network gateway 290a that is established for the cellular wireless connection to the Internet 52 which uses a BLUETOOTH wireless communication piconet0. The resource proxy also communicates with a second network gateway 290b that is established for the BLUETOOTH wireless communication wireless communication for the BLUETOOTH wireless communication piconet1 containing access point 470. The resource proxy also communicates with a third network gateway 290c that is established for the BLUETOOTH wireless communication wireless communication for the BLUETOOTH wireless communication piconet2 containing access point 475.

Gateways 290a–290c are each BLUETOOTH wireless communication gateways and therefore all communicate with single network interface 295a that is used for BLUETOOTH wireless communication, which communicates over the wireless nets 300a–300b to the resources 315, 310a and 310b. It is appreciated that a separate gateway is established for each different BLUETOOTH wireless communication piconet on which the access points are located. However, since only a single wireless communication mechanism is used, in this example, only a single network interface is used.

The operation of the example of FIG. 11A and FIG. 11B is now described. When the cell phone is turned on, the mobile device 100e detects the cell phone through BLUETOOTH wireless communication. A LAN access profile connection is then established to the cell phone. This causes a default routing entry to be added to the resource proxy 260. The present invention then initializes a network gateway 290a for the cell phone connection. This is BLUETOOTH wireless communication piconet0.

A web browser 250 is then initiated on the mobile device 100e. The web browser 250 is configured so that that the resource proxy 260 is configured as its proxy server. There are automatic protocols/specifications for proxy configuration which may be used, but are not required. One such example includes the automatic proxy configuration, and proxy configuration options of Netscape's Browser and MS Internet Explorer.

Any web browser request is proxied at the resource proxy 260. The only connection, at this stage, is the default Internet connection. A request is sent through the network gateway associated with the cellular connection.

Assume that the mobile device 100e moves within range of another BLUETOOTH wireless communication device (access point 1) 470, a LAN access point. Well known service discovery procedures are then performed on detected device (access point 1). Namely, a LAN access profile determined and a PPP connection is established to the access point and an IP address is assigned. At this stage, the present invention initializes network gateway 290b. The gateway then searches for Information server (e.g., using an IP broadcast). Then the information server 310a is detected. The gateway 290b then reads the available resources information including a web proxy server and the location server (indicating the location of the access point1). The web proxy IP addresses are used as proxy. The gateway 290b then adds the entries to the resource table indicating the new resources and also updates the gateway table of the resource proxy.

At this stage, the web browser 250a could request an HTML page of available resources by requesting the information through the root file of the proxy server address using the exemplary syntax:

Http://localhost/

The proxy server 260 then returns a list of information indicating the URLs available (with an optional text or graphical annotation if available). The user can filter the amount of information displayed on the screen from the resource proxy based on filters 255a–255c (FIG. 7). The filters may contain specific keywords and attributes that can be searched to identify certain resources thereby filtering others out.

When the web browser 250a requests a page from the resource proxy 260, the name/IP address is queried from the gateway table 280 and the request is passed along to the corresponding network gateway 290b.

When the mobile device 100e moves into range of piconet 2 (access point2 475), a new network gateway 290c is created by the present invention and is associated with piconet 2. At this point, gateway 290c identifies the new resources and the new resources are added to resource table 270. Entries are then added/adjusted in gateway table 280.

When the mobile device 100e becomes out of range of access point 1 (piconet 1), then the network gateway 290b that is associated with piconet 1 is put in the down status state. In response to this, the resources associated with network gateway 290b are put in the down or unavailable state provided no alternative network gateway is available. The gateway table 280 is then adjusted to reflect this.

The preferred embodiment of the present invention, a resource proxy for a mobile wireless electronic device facilitating the presentation and processing of location based information, is thus described. While the present invention has been described in particular embodiments, it should be appreciated that the present invention should not be construed as limited by such embodiments, but rather construed according to the below claims.

What is claimed is:

1. A mobile device comprising:
   a first wireless communication interface for communicating with a first set of location specific resources using a first wireless communication protocol;
   a second wireless communication interface for communicating with a second set of location specific resources using a second wireless communication protocol;
   a resource proxy for storing a listing of location specific resources discovered by using said first and second wireless interfaces, said listing comprising at least one Uniform Resource Locater associated with at least one said location specific resource; and
   an application coupled to communicate with said resource proxy and for receiving said listing of location specific resources and for requesting information from one of said location specific resources using said Uniform Resource Locater.

2. A mobile device as described in claim 1 further comprising gateway networks coupled between said wireless communication interfaces and said resource proxy, said gateway networks for performing automatic resource discovery and for updating said resource proxy based on said automatic resource discovery.

3. A mobile device as described in claim 2 wherein a separate gateway network is provided for each different external access point of said location specific resources.

4. A mobile device as described in claim 1 wherein said first wireless communication protocol is compliant with a wireless PAN protocol.

5. A mobile device as described in claim 1 wherein said first wireless communication protocol is compliant with the wireless LAN communication protocol.

6. A mobile device as described in claim 4 wherein said second wireless Currently Amended protocol is compliant with the wireless LAN communication protocol.

7. A mobile device as described in claim 1 wherein said first wireless communication protocol is compliant with a cellular phone wireless protocol.

8. A mobile device as described in claim 1 wherein said resource proxy comprises:
   a resource table comprising identifications for location specific resources; and
   a gateway table comprising pathway information for each location specific resource of said resource table.

9. A mobile electronic device as described in claim 1 further comprising a filter coupled between said application and said resource proxy, said filter for filtering resources of said resource proxy based on predetermined keywords.

10. A mobile electronic device comprising:
    a memory resident resource proxy for storing information identifying resources and gateways to access said resources, said information formatted using a Uniform Resource Locater;
    a first wireless communication interface for maintaining wireless communication with a first external source using a first communication protocol;
    a second wireless communication interface for maintaining wireless communication with a second external source using a second communication protocol;
    a first network gateway coupled to said resource proxy and to said first wireless communication interface, said first network gateway for performing automatic resource discovery regarding resources accessible over said first wireless communication interface and for recording said resources with said resource proxy using said Uniform Resource Locater;
    a second network gateway coupled to said resource proxy and to said second wireless communication interface, said second network gateway for performing automatic resource discovery regarding resources accessible over said second wireless communication interface and for recording said resources with said resource proxy using said Uniform Resource Locater; and
    an application program for referencing said resource proxy using said Uniform Resource Locater to obtain a list of location based resources.

11. A mobile electronic device as described in claim 10 wherein said first communication protocol is compliant with a wireless PAN protocol.

12. A mobile electronic device as described in claim 10 wherein said first communication protocol is compliant with the wireless LAN communication protocol.

13. A mobile electronic device as described in claim 11 wherein said second communication protocol is compliant with the wireless LAN communication protocol.

14. A mobile electronic device as described in claim 10 wherein said first communication protocol is compliant with a cellular phone wireless protocol.

15. A mobile electronic device as described in claim 10 wherein said resource proxy comprises:
    a memory resident resource table comprising identifications for location based resources; and
    a memory resident gateway table comprising pathway information for each location based resource of said resource table.

16. A mobile electronic device as described in claim 10 further comprising a filter coupled between said application and said resource proxy, said filter for filtering resources of said resource proxy based on predetermined keywords.

17. In a mobile electronic device, a method for detecting available resources comprising:
    a) automatically discovering a first set of location specific resources using a first wireless communication protocol;
    b) automatically discovering a second set of location specific resources using a second wireless communication protocol;

c) storing said first and second sets of location specific resources into a resource proxy of said mobile electronic device using a is Uniform Resource Locator;

d) updating said resource proxy as said mobile electronic device moves; and e) an application resident on said mobile electronic device receiving a list of location specific resources and requesting information from one of said location specific resources using said Uniform Resource Locater.

18. A method as described in claim 17 further comprising the step of filtering resources of said resource proxy based on predetermined keywords to generate said list of said step e).

19. A method as described in claim 17 wherein said first wireless communication protocol is compliant with a wireless PAN protocol.

20. A method as described in claim 17 wherein said first wireless communication protocol is compliant with the wireless LAN communication protocol.

21. A method as described in claim 19 wherein said second wireless communication protocol is compliant with the wireless LAN communication protocol.

22. A method as described in claim 17 wherein said first wireless communication protocol is compliant with a cellular phone communication protocol.

* * * * *